US012289035B2

(12) United States Patent
Chassagne et al.

(10) Patent No.: US 12,289,035 B2
(45) Date of Patent: Apr. 29, 2025

(54) AIRCRAFT TURBINE ENGINE EQUIPPED WITH AN ELECTRICAL MACHINE (71) Applicant: SAFRAN AIRCRAFT ENGINES, Paris (FR)

(72) Inventors: Amelie Argie Antoinette Chassagne, Moissy-Cramayel (FR); Clement Marcel Maurice Dejeu, Moissy-Cramayel (FR); Loic Paul Yves Guillotel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 77 days.

(21) Appl. No.: 17/908,748

(22) PCT Filed: Mar. 23, 2021

(86) PCT No.: PCT/FR2021/050489
§ 371 (c)(1),
(2) Date: Sep. 1, 2022

(87) PCT Pub. No.: WO2021/191553
PCT Pub. Date: Sep. 30, 2021

(65) Prior Publication Data
US 2023/0125576 A1 Apr. 27, 2023

(30) Foreign Application Priority Data
Mar. 25, 2020 (FR) ...................... 2002896

(51) Int. Cl.
H02K 5/20 (2006.01)
F01D 15/10 (2006.01)
H02K 7/18 (2006.01)

(52) U.S. Cl.
CPC ........... H02K 7/1823 (2013.01); F01D 15/10 (2013.01)

(58) Field of Classification Search
CPC .............................. H02K 7/1823; F01D 15/10
See application file for complete search history.

(56) References Cited

U.S. PATENT DOCUMENTS 3,264,482 A   8/1966  Clark et al.
5,334,897 A * 8/1994  Ineson ................... H02K 5/225
                                                                310/407
(Continued)

FOREIGN PATENT DOCUMENTS

EP    2270315 A2   1/2011
FR    2922265 A1   4/2009
(Continued)

OTHER PUBLICATIONS

International Search Report received for PCT Patent Application No. PCT/FR2021/050489, mailed on May 27, 2021, 8 pages (3 pages of English Translation and 5 pages of Original Document).

Primary Examiner — Sean Gugger
(74) Attorney, Agent, or Firm — WOMBLE BOND DICKINSON (US) LLP (57) ABSTRACT Disclosed is an aircraft turbine engine (10), comprising a gas generator (12) and a fan (14) arranged upstream from the gas generator (12) and configured to generate a gas inlet stream (F), part of which flows into a duct of the gas generator to form a primary stream (36), the turbine engine (10) comprising an electrical machine that is mounted coaxially downstream from the fan (14) and that comprises a rotor (62a) surrounded by a stator (62b) carried by an annular shroud (64), this shroud (64) being surrounded by a casing (40) of the gas generator that defines, with this shroud (64), a section of the flow duct for the primary stream (36), stationary vanes (42, 68) for straightening this primary stream (36) extending into this path.

16 Claims, 5 Drawing Sheets (56) References Cited

U.S. PATENT DOCUMENTS

| | | | |
|---|---|---|---|
| 9,109,452 B2 | 8/2015 | Martin et al. | |
| 2009/0120100 A1 | 5/2009 | Merry et al. | |
| 2010/0326050 A1 | 12/2010 | Schilling et al. | |
| 2013/0323080 A1* | 12/2013 | Martin | F01D 5/145 416/97 R |
| 2015/0377058 A1* | 12/2015 | Hiernaux | F01D 5/145 415/10 |
| 2019/0316486 A1* | 10/2019 | Roberge | F02C 7/18 |
| 2020/0067383 A1* | 2/2020 | Hon | H02P 9/12 |
| 2022/0268205 A1* | 8/2022 | Seki | H02K 7/085 |

FOREIGN PATENT DOCUMENTS

| | | |
|---|---|---|
| WO | 2006/060014 A1 | 6/2006 |
| WO | 2015/077755 A1 | 5/2015 |

* cited by examiner

AIRCRAFT TURBINE ENGINE EQUIPPED WITH AN ELECTRICAL MACHINE

TECHNICAL FIELD OF THE INVENTION

The present invention relates to an aircraft turbine engine equipped with an electrical machine.

TECHNICAL BACKGROUND

The prior art comprises in particular the document FR-A1-2 842 565 which describes a turbine engine equipped with an electrical machine. The prior art further comprises EP-A2-2 270 315, U.S. Pat. No. B2 9,109,452, U.S. Pat. No. 3,264,482, FR-A1-2 922 265, WO-A1-2006/0600144 and WO-A1-2015/077755.

The aeronautical world is now asking many questions about the relevance of using hybrid engines for commercial aviation. The use of electrical energy is now considered not only to meet the functions of the aircraft but also to electrify the functions of the turbine engine.

This observation leads to the study of hybrid engine architecture solutions, combining fossil energy of the fuel and electrical energy to ensure the driving of the propulsion portion (fan of the turbine engine) and the feeding of certain engine and/or aircraft functions.

These architectures can in particular be based on a high bypass ratio and reducer type architecture, but also on a multiple body architecture (2 or 3). In these architectures, the turbine engine comprises a low pressure body and a high pressure body, each body comprising a shaft connecting a rotor of a compressor to a rotor of a turbine.

It is known to equip an aircraft turbine engine with one or more electrical machines on the high-pressure and/or low-pressure portions of the turbine engine, ranging from a few kW to several MW. We recall that an electrical machine is an electromechanical device based on the electromagnetism allowing the conversion of electrical energy into work or mechanical energy for example. This process is reversible and can be used to produce electricity.

Thus, depending on the final use of a machine, we use the terms of:
  generator to designate an electrical machine producing electrical energy from a mechanical energy,
  motor for an electrical machine producing a mechanical energy from an electrical energy.

An electrical machine can also behave in motor mode as well as in generator mode.

The cooling method of the electrical machine is complex and very important to ensure the proper functioning of the latter. In particular, it must be compatible with the thermal losses of the electrical machine that must be dissipated.

The current solutions foresee in particular a cooling of the electric stator of the electrical machine by the air flow rate of the turbine engine associated with an additional complex cooling done with oil in order to guarantee a sufficient cooling of the electrical machine.

The present invention proposes a solution to at least some of the above problems and in particular proposes a solution for improving the cooling of an electrical machine not using additional cooling done with oil.

SUMMARY OF THE INVENTION

The invention relates to an aircraft turbine engine, comprising a gas generator and a fan arranged upstream of the gas generator and configured to generate a gas inlet stream, a portion of which flows in a duct of the gas generator to form a primary stream, and another portion of which flows in a duct around the gas generator to form a secondary stream, the turbine engine further comprising an electrical machine which is mounted coaxially downstream of the fan and which comprises a rotor surrounded by a stator carried by an annular shroud, this shroud being surrounded by a casing of the gas generator which delimits, with this shroud, a stretch of said flow duct for the primary stream, stationary vanes for straightening this primary stream extending in this duct.

According to the invention, said shroud and/or said vanes comprise elements configured to generate disturbances in the primary stream.

The elements generating disturbances in the primary stream increase the exchange coefficient between the latter and the shroud and/or the vanes and thus the thermal exchange capacity between the primary stream and the electrical machine without causing as much load loss as an integral shaping of the shroud and/or the vanes. The cooling of the shroud and/or the vanes and thus of the electrical machine is thus improved with an equivalent primary stream rate.

In addition, the disturbances or turbulences allow to move the air close to the surface to be cooled of the shroud and/or the vanes. The heated air does not stagnate, and is directed by turbulence towards the colder secondary stream, before returning against the surface to be cooled of the shroud and/or the vanes. The vortex created renews the cold air in contact with the hot surface to be cooled of the shroud and/or the vanes of the electrical machine.

This improves the cooling of the electrical machine and can be done exclusively with air from the primary stream. The invention thus allows to avoid the addition of an oil cooling loop, which allows in particular to considerably lighten the assembly.

The module according to the invention may comprise one or more of the following characteristics, taken alone or in combination with each other:
  the elements are recessed or protruding on one or more surfaces of the shroud and/or the vanes, the surface or each of the surfaces being intended to be swept by the primary stream;
  the surface or each of the surfaces comprises a matrix of identical recessed elements distributed in rows and columns, either in a linear or staggered manner;
  each of the elements has a concave curved shape in cross-section.
  each of the elements has a width or dimension D between 2 mm and 30 mm, and a depth P less than or equal to D;
  the surface or each of the surfaces comprises a series of elements shaped like an elongated groove extending substantially in a flow direction of the primary stream;
  the grooves are corrugated;
  the surface or each of the surfaces comprises a series of protruding elements formed by fins;
  the fins have a triangular or delta shape;
  the fins are movable or retractable so as to regulate the disturbances in the primary stream;
  the elements comprise plasma generating actuators on the or each of the surfaces intended to be swept by the primary stream;
  the actuators are supplied by said electrical machine;
  the actuators are evenly distributed around the electrical machine;

the shroud comprises an internal annular surface surrounding the stator of the electrical machine and an external annular surface extending around the internal annular surface and defining said stretch of the flow duct of the primary stream;

said elements are connected by one or more thermally conductive parts to said stator so as to ensure a heat exchange by conduction; it is indeed the contact or quasi-contact between the disturbance elements, one or two thermally conductive intermediate portions, and the stator of the electrical machine that allows a good cooling.

BRIEF DESCRIPTION OF THE FIGURES

Further characteristics and advantages of the invention will become apparent from the following detailed description, for the understanding of which reference is made to the attached drawings in which:

FIG. 3b is a schematic profile view of the elements of FIG. 3a;

DETAILED DESCRIPTION OF THE INVENTION

Figure 1:
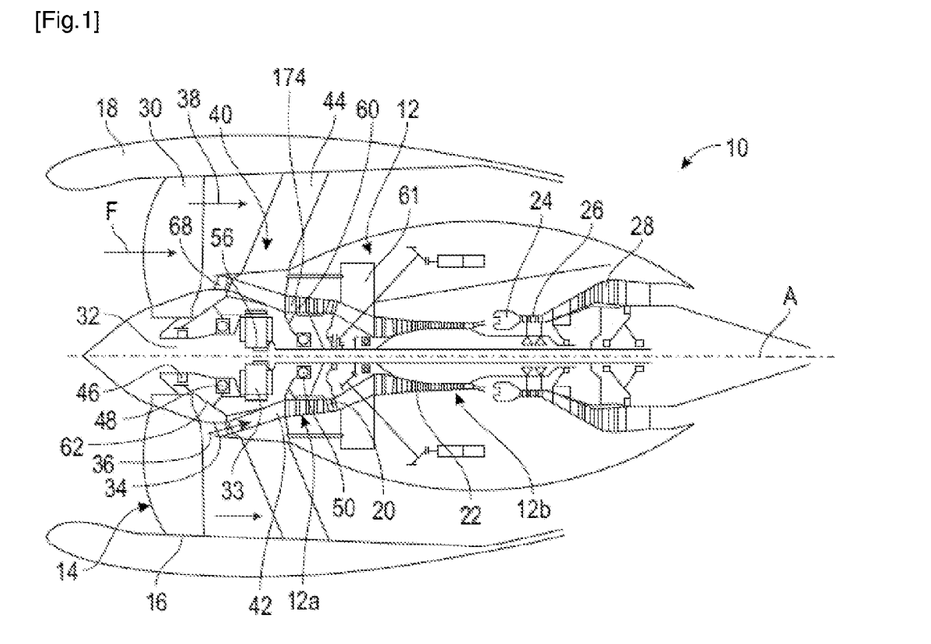
FIG. 1 is a schematic view in axial cross-section of an aircraft turbine engine with a high bypass ratio and reducer.

First, reference is made to FIG. 1, which schematically represents a double-body and double-flow aircraft turbine engine 10.

The turbine engine 10 conventionally comprises a gas generator 12, upstream of which is arranged a fan 14. The fan 14 is surrounded by a fan casing 16 which is surrounded by a nacelle 18 that extends around and along a major portion of the gas generator 12.

The gas generator 12 here comprises two bodies, namely a low pressure body 12a or LP and a high pressure body 12b or HP. Each body comprises a compressor and a turbine.

The terms "upstream" and "downstream" are considered along a main direction F of flow of the gases in the turbine engine 10, this direction F being parallel to the longitudinal axis A of the turbine engine.

From upstream to downstream, the gas generator 12 comprises a low-pressure compressor 20, a high-pressure compressor 22, a combustion chamber 24, a high-pressure turbine 26 and a low-pressure turbine 28.

The low-pressure 20 and the high-pressure 22 compressors are separated from each other by an intermediate casing 61.

The fan 14 comprises an annular row of vanes 30 driven in rotation by a fan shaft 32 which is connected to the rotor of the low pressure body 12a by means of a reducer 33. The fan 14 is configured to generate a gas inlet stream F, a portion of which flows into a duct of the gas generator, referred to as internal duct, to form a radially internal annular stream, referred to as primary stream 36, which supply the gas generator 12, and another portion of which flows in a duct around the gas generator, referred to as external duct, to form a radially external annular stream, referred to as secondary stream 38, which flows between the gas generator 12 and the nacelle 18 and provides most of the thrust of the turbine engine. The gas inlet stream F through the fan is thus separated upstream of the gas generator 12 into a primary 36 and secondary 38 stream by an annular splitter nose 34.

A gas generator casing, referred to as inlet casing 40 structurally connects the gas generator 12 to the fan casing 16 and the nacelle 18. The inlet casing 40 comprises an annular row of radially internal arms 42 extending into the primary stream 36 i.e., into the internal duct, an annular row of radially external straightener vanes 44 (of the OGV type) extending into the secondary stream 38, and bladed straighteners 174 extending into the primary stream 36 downstream of the annular row of arms 42.

The turbine engine also comprises an annular row of stationary straightening vanes 68 of the primary stream 36 extending into the internal duct and arranged upstream of the arms 42.

The arms 42 are generally limited in number (less than ten) and are tubular and crossed by auxiliaries. The number of vanes 44 (OGV) is generally higher than ten.

The fan shaft 32 is guided in rotation upstream by bearings 46, 48. These bearings 46, 48, are of the ball or roll type and each comprise an internal ring mounted on the shaft to be guided, an external ring carried by an annular bearing support and rolling-elements between the rings.

Figure 2:
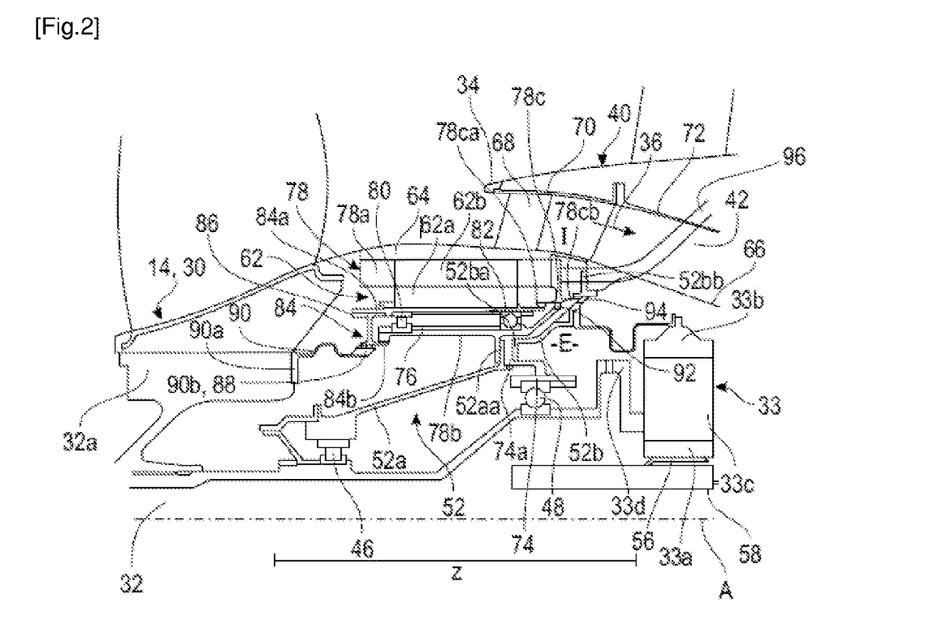
FIG. 2 is a partial schematic half view in axial cross-section of an aircraft turbine engine equipped with an electrical machine.

In a known way, the reducer 33 is of the epicyclic gear train type and comprises a sun gear 33a centred on the axis A, a ring gear 33b extending around the axis and planet gears 33c which mesh with the sun gear and the ring gear and are carried by a planet carrier 33d (the references 33a-33d being visible in FIG. 2).

In the example shown, the ring gear 33b is stationary and fixedly connected to a support 52 of the bearings 46, 48. The planet carrier 33d is rotatable and connected to the fan shaft 32 of the reducer, which further comprises an input shaft 56 meshed with the sun gear 33a. The input shaft 56 is coupled to the main shaft 58 of the low-pressure body.

The input shaft 56 is guided by a bearing 50 that is carried by a bearing support 60 (FIG. 1).

The bearing supports 52, 60 extend around the axis A and are stationary parts connected to the inlet casing 40.

FIG. 2 is a larger scale view of a portion of FIG. 1, and in particular the area Z located between the fan disc 32a and the reducer 33, in which an electrical machine 62 is installed. The electrical machine 62 is mounted coaxially downstream of the fan 14.

In addition to being delimited axially, upstream, by the fan disc 32a, and downstream, by the reducer 33, this annular area Z is delimited radially inside by the fan shaft 32 of the reducer and radially outside by the elements that internally delimit the flow duct of the primary stream 36. These elements comprise, on the one hand, an annular shroud 64 located upstream and an internal annular wall 66 located downstream connected to the radially internal ends of the arms 42.

The wall 66 extends as an extension of the shroud 64 which is an internal shroud and is connected by the annular row of stationary straightening vanes 68 of the primary stream 36 extending into the internal duct to an external shroud 70 forming part of the inlet casing 40.

The shrouds 64, 70 define between them the air inlet of the flow duct of the primary stream 36. The shroud 70 extends between the aforementioned splitter nose 34 and an external annular wall 72 located downstream of the shroud 70 and which forms part of the inlet casing 40 as it is connected to the radially external ends of the arms 42. The shroud 64 is thus surrounded by the inlet casing 40 which, together with the shroud 64, delimits a stretch of the flow duct of the primary stream 36.

The annular area Z is divided into two annular segments, upstream and downstream respectively, by the bearing support 52. In the example shown, this support has a general frustoconical shape flaring downstream. Its upstream and radially internal end carries the external ring of the bearing 46, the internal ring of which is attached to the fan shaft 32. The downstream and radially external end of the support 52 is attached to the inlet casing 40.

The external ring of the or each bearing 48 is attached to the support 52, substantially in the middle, with the or each internal ring being attached to the fan shaft 32. For this purpose, the bearing support 52 comprises two annular stretches, respectively upstream 52a, and downstream 52b. The upstream stretch 52a extends from the bearing 46 to a radially external annular flange 52aa, and the downstream stretch 52b extends from a radially internal annular flange 52ba to a radially external annular flange 52bb for attachment to the upstream end of the inlet casing 40.

The or each external ring of the bearing 48 is attached to an annulus 74 that comprises a radially external annular flange 74a interposed between the flanges 52aa and 52ba. These flanges 52aa, 74a, 52ba are applied axially against each other and comprise orifices for the passage of screw-nut type attachment means.

The downstream segment of the area Z represents a portion of a lubrication enclosure for the bearings 46, 48 and 50 as well as the reducer 33, which is housed in this enclosure, being arranged axially between the bearings 46, 48 on the one hand and the bearing 50 on the other. An oil fog reigns in this enclosure.

The upstream segment of the area Z represents the installation location of the electrical machine 62, which is therefore isolated from the enclosure E by the bearing support 52.

The machine 62 has a generally annular shape and comprises a rotor 62a and a stator 62b. The rotor 62a has a generally cylindrical shape extending about the axis A and is carried by a support element 76 which itself has a generally cylindrical shape. The rotor 62a is arranged around this element 76.

The stator 62b also has a generally cylindrical shape and is integrated with an annular member 78 having a generally C-shaped axial cross-section. This member 78 comprises two annular portions, respectively internal 78b and external 78a, which extend around each other and whose downstream ends are connected together by an annular bottom 78c. The member 78 thus defines an opening which is here oriented axially upstream and in which the rotor 62a as well as the support element 76 are housed.

The stator 62b is integrated with the external portion 78a of the member or forms this external portion 78a. This external portion 78a is surrounded, here directly by the shroud 64.

The portion 78b of the member 78 extends radially inwardly from the rotor 62a and the support element 76 and bearings 80, 82 are mounted between this element 76 and the portion 78b to rotatably guide the rotor 62a relative to the stator 62b. The portion 78b thus forms a support for the bearings 80, 82.

The bearings 80, 82 are here two in number and axially spaced apart from each other. The upstream bearing 80 is a roll bearing and the downstream bearing 82 is a ball bearing.

An annular closure element 84 is fitted and attached to the upstream end of the support element 76.

This closure element 84 has a generally radial orientation and is attached at its external periphery to the upstream end of element 76. The element 84 comprises at its external periphery a cylindrical rim 84a which is axially tightened against an internal annular rib of the support element 76 by a nut 86 axially fitted from upstream.

The internal periphery of the element 84 has an internal diameter less than the major internal diameter of the member portion 78b and carries a series of internal rectilinear splines 88. The internal periphery of the element 84 further comprises an annular web 84b extending axially downstream and sealingly cooperating with the upstream end of the portion 78b. The sealing is ensured by a labyrinth seal whose annular wipers are, for example, carried by the web 84b and the abradable coating is carried by the portion 78b.

An annular connecting element 90 is used to drive the rotor 62a. This element 90 is generally cylindrical in shape and comprises at its upstream end an annular flange 90a for attachment to the fan disc 32, and at its downstream end a series of splines 90b for coupling to splines 88 of the closure element 84.

The splines 88, 90b can advantageously be of the swivel type to isolate the machine as much as possible from the rest of the motor.

The bearings 80, 82 are advantageously lubricated and are located in a mini annular lubrication enclosure which is sealed upstream by the seal between the web 84b and the portion 78b, and downstream by the seal between a web 78ca and the element 76. The lubricating oil for the bearings 80, 82 is intended to be evacuated from this mini enclosure through axial holes 92 provided in the bottom 78c, just at the internal periphery of the webs 78ca and 78cb. These holes 92 allow oil to enter an annular space extending between the bottom 78c and the stretch 52b of the bearing support 52. Axial holes 94 are further provided on this stretch 52b, substantially opposite the holes 92, for this oil to enter the enclosure and be evacuated in the scope of the oil evacuation from this enclosure. Thus, it is understood that the lubricating oil for the bearings 80, 82 will centrifugally flow to the web 78ca, pass through the holes 92, flow onto the web 78cb, and then pass through the holes 94 to merge with the lubrication enclosure of the reducer 33.

The oil can be evacuated through one of the arms 42 of the inlet casing 40. Another one of the arms 42 can be used to convey the oil for supplying the bearings 80, 82, to the aforementioned mini enclosure.

The stator 62b is connected by an electric cable 96 to a control circuit, this cable 96 here passes through a tubular arm 42 of the inlet casing 40. The stator 62b is carried by the annular shroud 64.

The electrical machine 62 is thus in direct contact with the shroud 64 and with the vanes 42, 68 by means of the shroud 64. The electrical machine 62 can thus be cooled by the primary stream 36 contacting the shroud 64 and the vanes 42, 68.

The convection thermal exchange allowing the cooling of the electrical machine is then written as follows:

$$Stream = h*S*(Tm-Ta)$$

With:
Stream: the heat stream exchanged
h: the exchange coefficient
S: the exchange surface
Tm: the temperature of the metal to be cooled (i.e. in this case the shroud 64 and/or the vanes 42, 68)
Ta: the cooling air temperature (i.e. here the temperature of the primary stream 36)

Thus, to increase the heat flow exchanged, and thus improve the cooling of the electrical machine 62, it is possible to either increase the exchange coefficient h, or the exchange surface S, or both (the air temperature Ta being attached by the temperature at the outlet of the fan).

As seen in FIGS. 3 to 6 and according to the invention, the shroud 64 and/or the vanes 42, 68 comprise elements 100 configured to generate disturbances in the primary stream 36. The elements 100 are configured to increase the exchange coefficient h and/or the exchange surface S between the primary stream 36 and the electrical machine.

The exchange surfaces between the primary stream 36 and the electrical machine comprise the surface of the internal duct of the casing surrounding the stator of the electrical machine, i.e., the surface of the shroud 64 as well as the surface of the vanes 42, 68 which act as cooling fins. The elements 100 are thus located on one or more exchange surfaces 150 located on the shroud 64 and/or the vanes 42, 68 intended to be swept by the primary stream 36.

The elements 100 are, for example, recessed or protruding on the surface or the surfaces 150 of the shroud 64 and/or the vanes 42, 68. The hollow or protruding shape of the elements 100 allows both to act as a disrupter of the primary stream 36 so as to increase the exchange coefficient and to increase the exchange surface between the primary stream and the electrical machine.

Figure 3A:
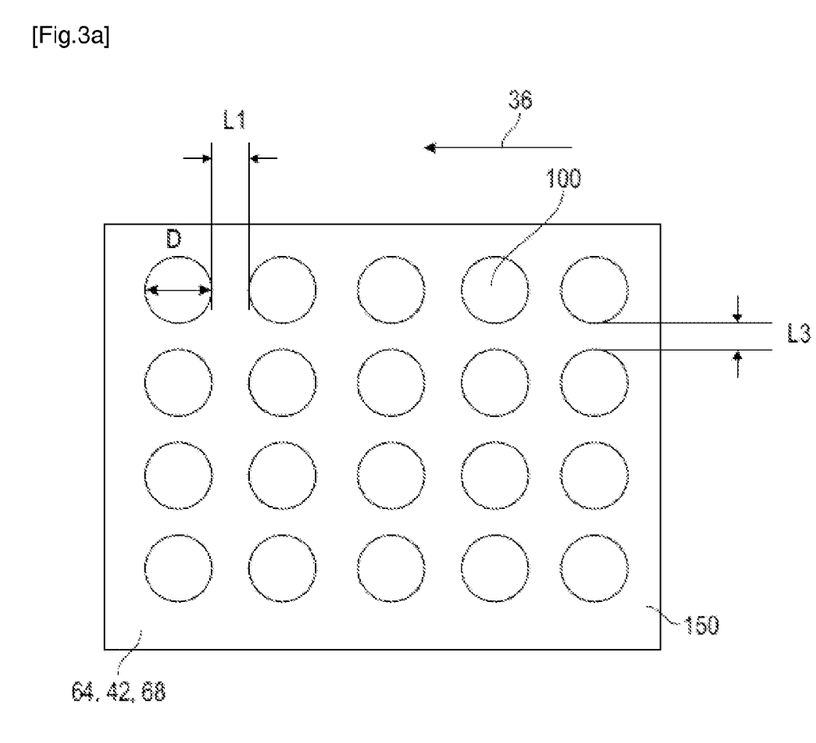
FIG. 3a is a schematic view of the top of the elements configured to disrupt an air stream through the turbine engine.
Figure 3B:
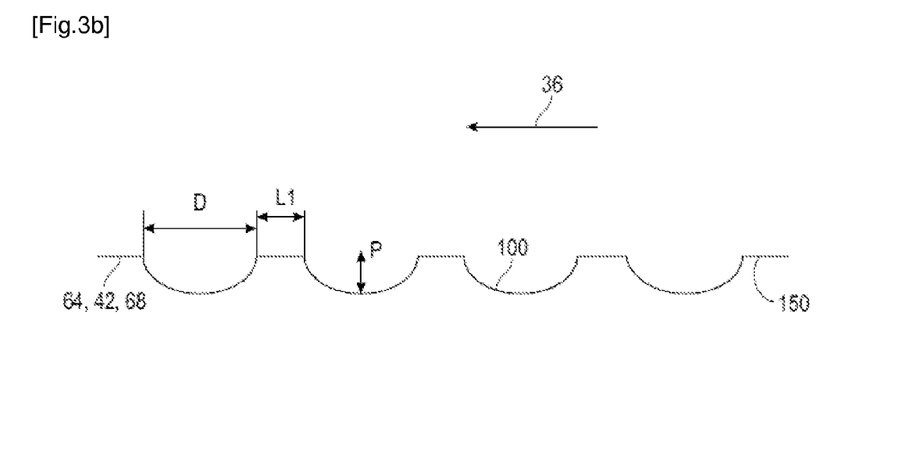

As illustrated in FIGS. 3a and 3b, the surface 150 or each of the surfaces 150 comprises, for example, a matrix of identical recessed elements 100 arranged in rows and in columns. Each of the elements 100 has, for example, a concave curved shape in cross-section and represents a particular example of a recessed element. This is a "golf ball" type structure with a succession of recess of depth and diameter to be determined according to the cooling requirement.

Each of the elements 100 here has a width or dimension D measured along the direction of flow of the primary stream 36 and is between 2 and 30 mm, and a depth P less than or equal to D.

The elements 100 are spaced apart from each other by a dimension L1 in the direction of flow of the primary stream 36 and by a dimension L3 in a direction perpendicular to the direction of flow of the primary stream 36.

The parameters D, L1, L2 and P are chosen in order to have the best compromise between the criteria of cooling performance, manufacturing, aerodynamic impact in the duct, and cost. Moreover, these dimensions can also be variable in the surface 150 for an optimal sizing.

The above example considers recesses to increase the exchange surface, but it is also possible to replace the recesses by bumps, following the same principle. The depth parameter is then replaced by a height parameter to size the bumps.

All or portion of the surface 150 can benefit from this shaping. In particular, the surface of the shroud 64 is preferred over the surfaces of the vanes 42, 68, in order to limit the impact on the performance.

This solution comprising a matrix of identical recessed elements 100 distributed in rows and in columns focuses on the increasing of exchange surfaces but also acts on the exchange coefficient. Indeed, when in contact with the non-smooth surface, the flow tends to become turbulent, which increases the exchange coefficient.

Figure 4:
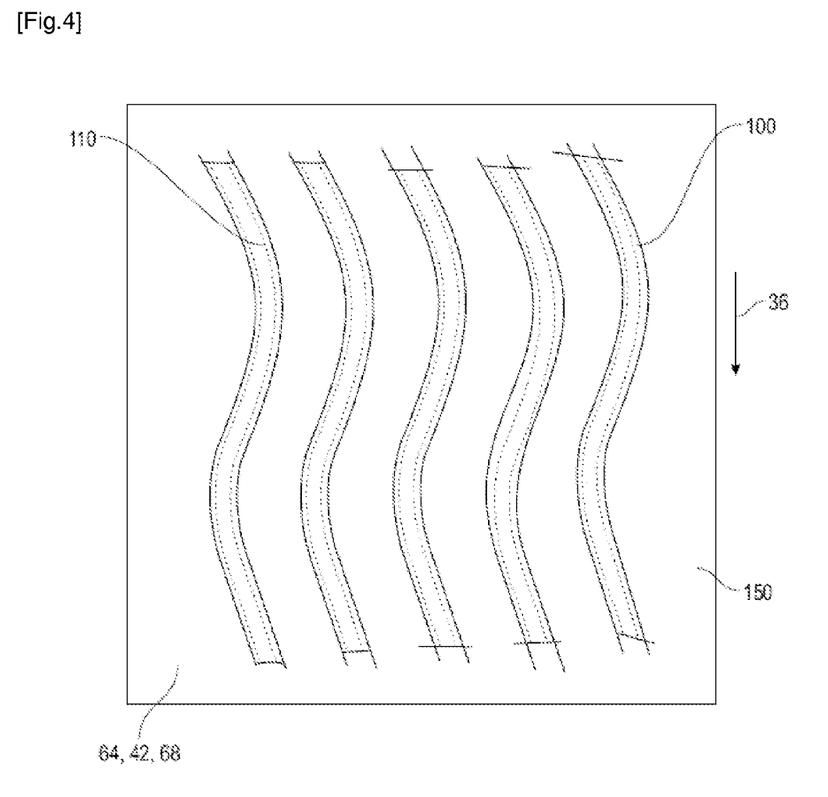
FIG. 4 is a schematic profile view of a variant embodiment of the elements shown in FIG. 3b.

As seen in FIG. 4, the surface 150 or each of the surfaces 150 comprises, for example, a series of elements 100 shaped like an elongated groove 110 extending substantially in a flow direction of the primary stream 36. They extend longitudinally in particular in the direction of flow of the primary stream 36. It is preferable to make grooves in the direction of flow so as not to disturb the flow in the duct too much, but grooves orthogonal to the direction of flow can also be considered.

In the same way as the "golf ball" shaping, the elements 100 shaped like grooves 110 allow to increase the exchange surface and the exchange coefficient and thus improve the cooling of the electrical machine.

The grooves 110 integrated into the cooling surface can be straight or corrugated so as to allow even more exchange surface.

In the same manner as before, the elements 100 shaped like a groove can be positioned on all or portion of the surface 150 to increase the surface.

If making elements 100 shaped like a groove 110 allows to simplify the manufacture of the surfaces 150 as well as to limit the mass of material, it is also possible to provide elements 100 in the form of bridges on the surface or the surfaces 150, in particular by adding material.

Figure 5:
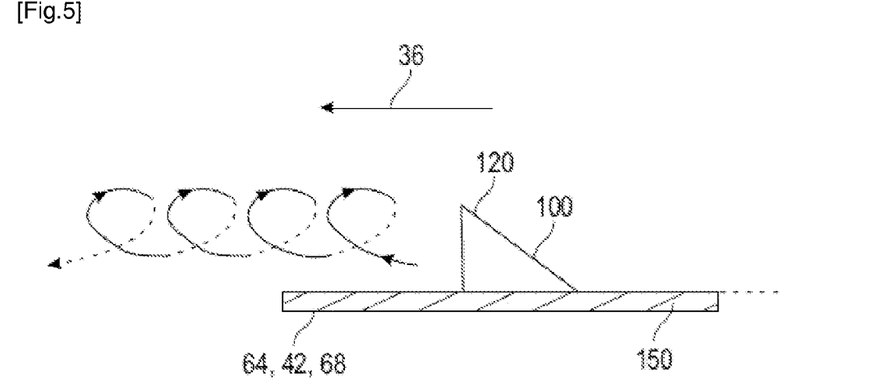
FIG. 5 is a schematic profile view of an alternative embodiment of the elements of FIG. 3b.

As illustrated in FIG. 5, the surface 150 or each of the surfaces 150 may comprise a series of projecting elements 100 formed by fins 120.

By disturbing the primary stream 36, these fins 120 increase the exchange coefficient and thus the exchange capacity without causing as much pressure drop as an integral shaping of the surface 150. In addition, the turbulence allows the air near the surface 150 to move. The warmed air does not stagnate, it goes by turbulence towards the colder secondary stream, before returning against the surface 150. The vortex thus created renews the cold air in contact with the hot surface 150 of the shroud of the electrical machine.

The fins 120 have for example a triangular or delta shape which favours the generation of a powerful vortex.

The fins 120 will generate a pressure drop like an exchanger fin but are here movable or retractable so as to regulate the disturbances in the primary stream 36.

The circumferential density of the fins 120 will depend on the desired level of thermal exchange and pressure drop. In particular, fins 120 can be placed in several rows to maximize thermal exchange.

The example embodiment here comprises elements 100 shaped like fin 120, but several other shapes of disruptors may be possible. Preferably, the elements 100 are "vortex generator" type disruptors as are the fins 120.

Figure 6:
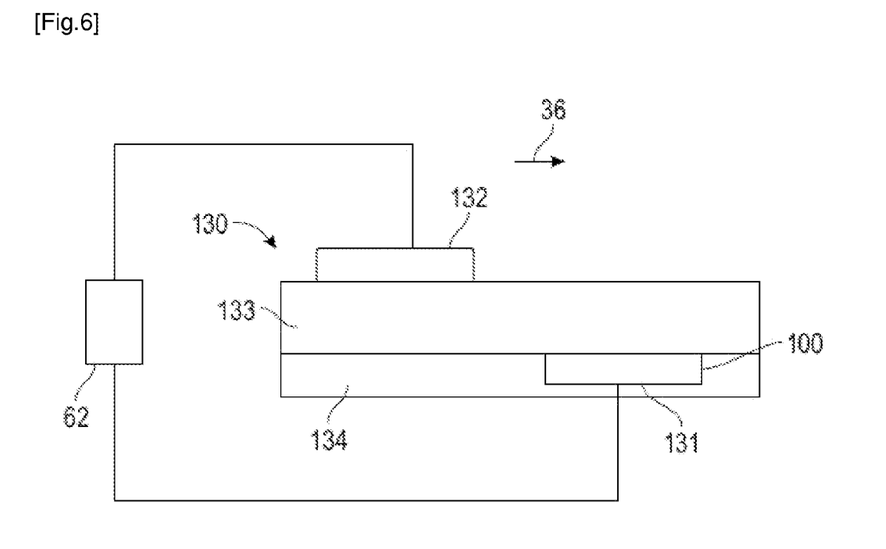
FIG. 6 is a schematic view of a plasma actuator.

As visible in FIG. 6, the elements 100 comprise plasma generating actuators 130 on the or each of the surfaces intended to be swept by the primary stream 36. The actuators 130 are ideally supplied by the electrical machine 62, but another electric source can also supply them. They each comprise a covered electrode 131 and an exposed electrode 132 offset from each other in the direction of flow of the primary stream 36. The covered electrode 131 is separated from the exposed electrode 132 by a dielectric material 133 and is located in a support 134.

The actuators 130 are evenly distributed around the electrical machine 62, for example, around the circumference of the shroud.

The plasma actuator 130, activated via the application of an electric current, induces a disturbance of the local flow speed, which will be developed downstream into turbulence. It allows the primary stream 36 to be set in motion without the need for any mechanical parts and without generating significant heat.

Placed along the circumference of the shroud, compared to the other flow control techniques previously presented, these electric actuators 130 devoid of movable parts allow the air on the shroud and the vanes 42, 68 to be accelerated and thus increase the heat exchanges, with little or no disruption to the flow of the primary stream 36 themselves when not activated. On the other hand, the use of these actuators 130 allows for an active control of the cooling efficiency by sending more or less, or even no, electrical current, in order to more or less disrupt the flow of the primary stream 36.

Figure 7:
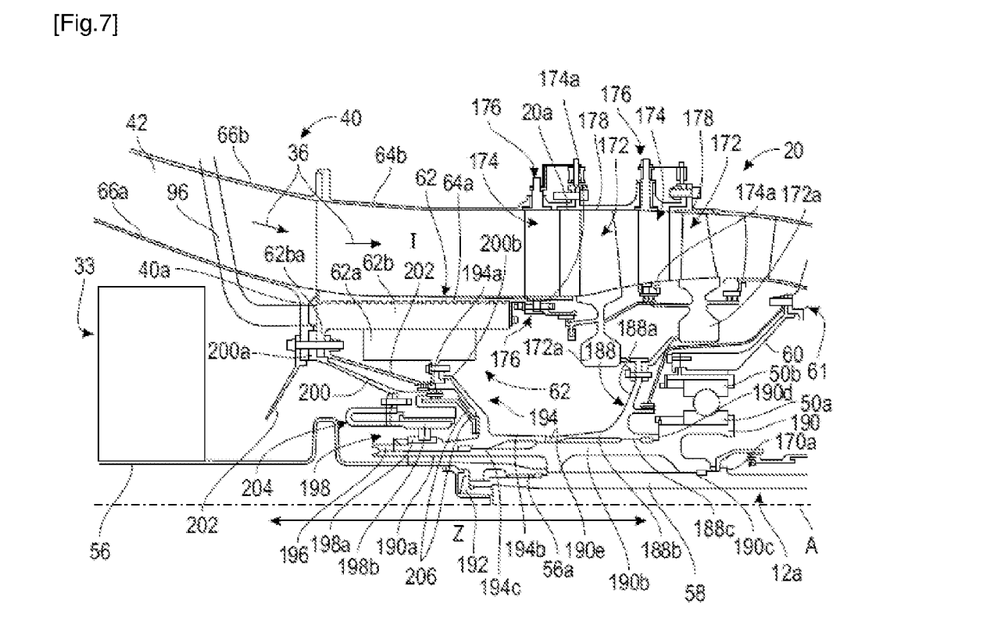
FIG. 7 is a half-view similar to that of FIG. 2 and showing a variant embodiment of an aircraft turbine engine equipped with an electrical machine.
Figure 8:
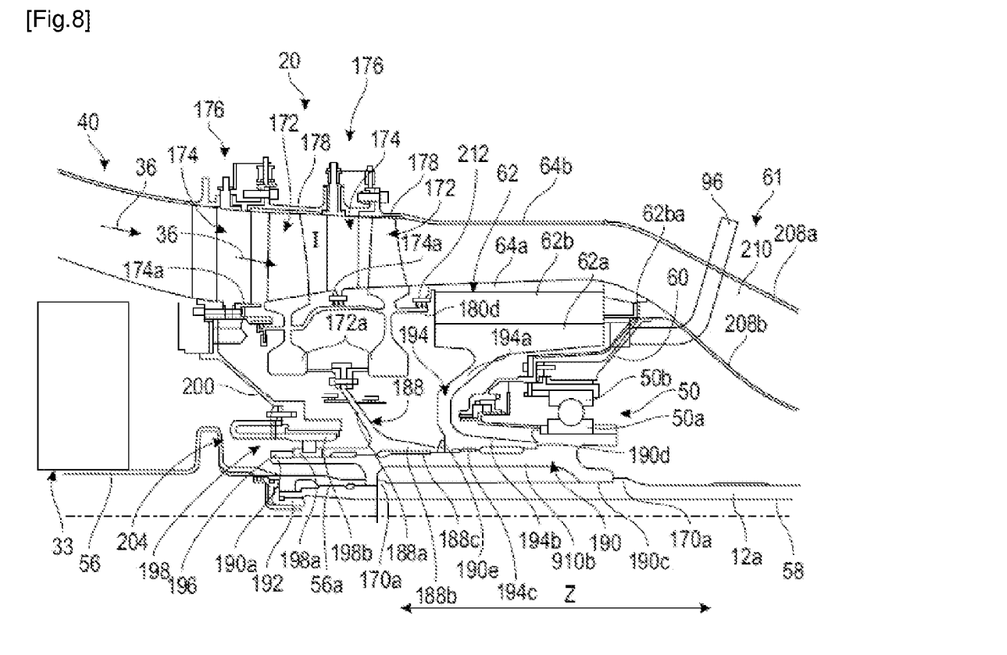
FIG. 8 is a half-view similar to that of FIG. 2 and showing a variant embodiment of an aircraft turbine engine equipped with an electrical machine.
Figure 9:
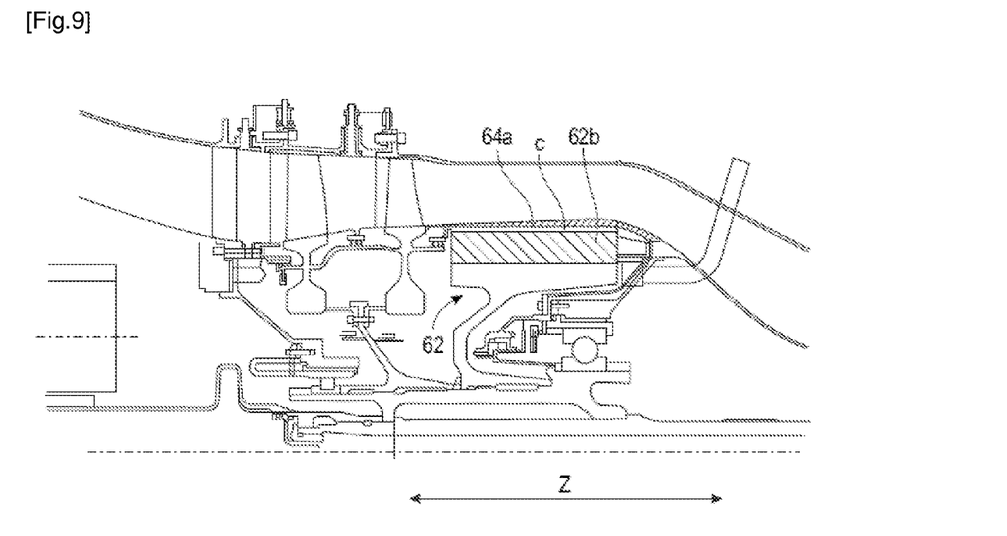
FIG. 9 is a half-view similar to that of FIG. 2 and showing a variant embodiment of an aircraft turbine engine equipped with an electrical machine.

The alternative embodiments of the invention shown in FIGS. 7 to 9, represent embodiments of the invention in which the electrical machine 62 is located downstream of the reducer.

FIG. 7 illustrates a variant embodiment in which the area Z is located downstream of the reducer 33 and upstream of the intermediate casing 61.

This annular area Z is delimited radially on the inside by the main shaft 58 of the low-pressure body 12*a* as well as by the input shaft 56 of the reducer 33, and radially on the outside by the elements which delimit internally the flow duct I for the primary stream 36. These elements comprise, from upstream to downstream, on the one hand an internal annular wall 66*a*, an annular shroud 64*a*, then discs 172*a* of wheels 172 and internal platforms 174*a* of the bladed straightener 174 of the low-pressure compressor 20.

The wall 66*a* surrounds the reducer 33 and is part of the inlet casing 40 as it is connected to the radially internal ends of the arms 42 whose radially external ends are connected to another external annular wall 66*b*. The shroud 64*a* extends around the electrical machine 62 and into the extension of the wall 66*a*.

The shroud 64*a* is an internal shroud and is surrounded by an external shroud 64*b*, the shrouds 64*a*, 64*b* defining between them a segment of the flow duct I of the primary stream 36 downstream of inlet casing 40 and upstream of the low-pressure compressor 20 and the intermediate casing 61. The shroud 64*b* extends from the downstream end of the wall 66*b* to a wall 20*a* that surrounds the wheels 172 and the straighteners 174 of the low-pressure compressor 20. The shroud 64*b* may be connected to or formed in one part with this wall 20*a*.

Classically, this wall 20*a* comprises, on the one hand, means 176 for guiding in rotation and for variable pitch of the vanes of the straighteners 174 around substantially radial axes, and abradable annular coatings 178 surrounding the wheels 172.

The shroud 64*a* has its downstream end also connected or attached to means 176 for rotatably guiding the straightener vanes 174 about the same axes.

The discs 172*a* of the wheels 172 of the compressor 20 are attached to a trunnion 188 which is driven by the shaft 58 by means of an intermediate shaft 190.

The trunnion 188 is annular in shape and has a general T-shape in axial cross-section. The trunnion 188 comprises a radial annular branch 188*a* whose internal periphery is connected to a cylindrical branch 188*b*. The external periphery of the radial branch 188*a* is attached by screws to flanges of the discs 172*a* of the wheels 172, and the cylindrical branch 188*b* comprises internal splines 188*c* for coupling to external splines of the intermediate shaft 190.

The intermediate shaft 190 is generally tubular in shape and comprises an upstream stretch 190*a* and a downstream stretch 190*b*. The trunnion 188 is mounted on the downstream stretch 190*b* of the intermediate shaft 190, this downstream stretch 190*b* comprising internal splines 190*c* for coupling to external splines of the main shaft 58, as well as a cylindrical shoulder 190*d* for axial support towards the downstream of the trunnion 188 and in particular of the downstream end of its cylindrical branch 188*b*. The intermediate shaft 190 may further comprise an external cylindrical surface 190*e* for centring the branch 188*b* and thus the trunnion 188.

The upstream stretch 190*a* of the intermediate shaft 190 extends around the downstream end of the input shaft 56 of the reducer 33. This input shaft 56 comprises internal splines 56*a* for coupling with external splines of the main shaft 58. In addition, a nut 192 is axially tightened to the upstream end of the main shaft 58 and axially supported on the input shaft 56 to axially tighten it against the intermediate shaft 190, which itself is axially supported on a cylindrical shoulder 170*a* of the main shaft 58.

At its downstream end, the intermediate shaft 190 carries the internal ring 50*a* of the bearing 50, here with balls, whose external ring 50*b* is carried by the bearing support 60. This support 60 is generally frustoconical in shape and flares axially downstream. Its larger diameter downstream end is attached to the intermediate casing 61.

This type of bearing 50 is conventionally lubricated and is located in an annular lubrication enclosure that is sealed to prevent any oil leakage particularly upstream, in the implantation area Z of the electrical machine 62.

Here, the rotor 62*a* is attached to an annular member 194 extending about the axis A.

The member 194 has a general T-shape in axial cross-section. The member 194 comprises a radial annular branch 194*a* whose internal periphery is connected to a cylindrical branch 194*b*. The external periphery of the radial branch 194*a* is attached by screws to the rotor 62*a*, and the cylindrical branch 94*b* comprises internal splines 194*c* for coupling to external splines of the intermediate shaft 190, and in particular of its upstream stretch 190*a*.

The downstream end of the cylindrical branch 194*b* is on the one hand axially supported on the upstream end of the cylindrical branch 188*b* of the trunnion 188, and on the other hand cooperates with the cylindrical centring surface 190*e* carried by the intermediate shaft 190.

A nut 196 is axially tightened to the upstream end of the intermediate shaft 190 and is axially supported on the member 194 to axially bias it against the trunnion 188.

At its upstream end, the cylindrical branch 194*b* of the member 194 carries an internal ring 198*a* of a bearing 198, here with rolls, whose external ring 198*b* is carried by another annular bearing support 200. This support 200 is generally frustoconical in shape and flares axially upstream. Its larger diameter upstream end is attached to the stator 62*b* of the electrical machine 62.

The stator 62b comprises at its upstream end a radially internal annular flange for attaching a plurality of flanges, including one 200a of the bearing support 200. The flange 62ba of the stator 62b is also attached to a flange 40a of the inlet casing 40, as well as to flanges of sealing covers 202 and/or deflectors.

The internal periphery of the bearing support 200 may be equipped with an oil film damping system 204, known as a squeeze-film. It may further comprise a cylindrical rim 200b oriented downstream and comprising an internal annular coating of abradable material.

Two annular sealing covers 206 may be attached to the member 194 and in particular to its radial branch 194a, and carry radially external annular wipers intended to cooperate on the one hand with the coating carried by the rim 200b, as well as with a similar coating carried by one of the covers 202 attached to the flange 62ba of the stator 62b.

The bearing 198 is conventionally lubricated and is located in an annular lubrication enclosure that is sealed to prevent any oil leakage in particular downstream, into the implantation area Z of the electrical machine 62.

The stator 62b is connected by an electric cable 96 to a control circuit, this cable 96 here passes through a tubular arm 42 of the inlet casing 40.

The electrical machine 62 and in particular its stator 62b is located as close as possible to the primary stream 36 as in the example embodiment shown in FIG. 2, thus allowing to provide a machine that is cooled by the primary stream 36.

FIG. 8 illustrates an alternative embodiment of a turbine engine according to the invention.

The elements described in the foregoing and found in this embodiment are designated by the same references.

The implantation area Z of the electrical machine 62 is located downstream of the reducer 33 and the compressor 20, and upstream of the intermediate casing 61.

This annular area Z is delimited radially on the inside by the main shaft 58 of the low-pressure body 12a as well as by the input shaft 56 of the reducer 33, and radially on the outside by the elements which delimit internally the flow duct I for the primary stream 36. These elements here comprise, from upstream to downstream, the discs 172a of the wheels 172 and the internal platforms 174a of the bladed straighteners 174 of the low-pressure compressor 20, the annular shroud 64a, and then an internal annular wall 208b.

The wall 208b is part of the intermediate casing because it is connected to the radially internal ends of arms 210 whose radially external ends are connected to another external annular wall 208a. The shroud 64a extends around the electrical machine 62 and into the extension of the discs 172a of the wheels 172 and the internal platforms 174a of the bladed straighteners 174 of the compressor 20.

The shroud 64a is an internal shroud and is surrounded by an external shroud 64b, shrouds 64a, 64b defining between them a segment of the flow duct I of the primary stream 36 downstream of the low-pressure compressor 20 and upstream of the intermediate casing 61. The shroud 64b extends from the downstream end of the wall 20a to an external annular wall 208a that is connected to the radially external ends of the arms 210 and thus forms part of the intermediate casing 61. The shroud 64b may be connected to or formed in one part with the wall 20a.

Classically, this wall 20a comprises, on the one hand, means 176 for guiding in rotation and for variable pitch of the vanes of the straighteners 174 around substantially radial axes, and abradable annular coatings 178 surrounding the wheels 172.

The shroud 64a comprises at its upstream end a cylindrical rim 212 oriented upstream and carrying an annular coating of abradable material intended to cooperate with wipers 180d carried by the disc 172a of the downstream wheel of the compressor 20.

The discs 172a of the wheels 172 of the compressor 20 are attached to a trunnion 188 which is driven by the shaft 58 by means of an intermediate shaft 190.

The stator 62b comprises at its downstream end an annular flange 62ba for attaching a plurality of flanges, one of which is the internal annular wall 208b. The flange 62ba of the stator 62b is also attached to a flange of the bearing support 60.

The internal periphery of the bearing support 60 may be equipped with an oil film damping system 204, known as a squeeze-film.

The bearing 198 is conventionally lubricated and is located in an annular lubrication enclosure that is sealed to prevent any oil leakage in particular downstream, into the implantation area Z of the electrical machine 62.

The stator 62b is connected by an electric cable 96 to a control circuit, this cable 96 passing through a tubular arm 110 of the intermediate casing 61.

As in the previous embodiment, the shroud 64a, which extends preferably directly around the stator 62b, has its radially external surface swept by the stream 36. The shroud 64a ensures the exchange of heat by thermal conduction between the stator 62b and the stream 36.

In the embodiments of the invention shown in FIGS. 7 and 8, the elements 100 could then be located, for example, on the shroud 64a and/or on the bladed straighteners 174.

FIG. 9 illustrates another alternative embodiment of the invention. The installation area Z of the electrical machine 62 is here similar to that of the embodiment in FIG. 8.

The electrical machine 62 is similar to that of FIG. 8 except that the cover C of its stator 62b is dissociated from the shroud 64a. Other characteristics of this variant embodiment are similar to those of the embodiment in FIG. 8.

The invention claimed is:

1. An aircraft turbine engine, comprising a gas generator and a fan arranged upstream of the gas generator and configured to generate a gas inlet stream, a portion of which flows in a duct of the gas generator to form a primary stream and another portion of which flows in a duct around the gas generator to form a secondary stream, said fan having a fan shaft which is connected to a first rotor of the gas generator by means of a mechanical reducer, the turbine engine further comprising an electrical machine which has an annular shape and which is mounted coaxially downstream of the fan and upstream of the mechanical reducer, said electrical machine comprising a second rotor surrounding the fan shaft and surrounded by a stator, wherein said stator is carried by an annular shroud which surrounds said stator without spacing therebetween, said annular shroud extending axially downstream from the fan, wherein said shroud is surrounded by a casing of the gas generator which, together with said shroud, delimits an entrance and a stretch of said flow duct for the primary stream, wherein stationary vanes for straightening said primary stream extend in said stretch, wherein said shroud and/or said stationary vanes comprise elements configured to generate disturbances in the primary stream, wherein the shroud comprises an external annular surface that extends around the electrical machine and defines said stretch of the flow duct of the primary stream, wherein said external annular surface comprises an upstream end surrounding an upstream end of the electrical machine and located upstream of said entrance, wherein said external annular surface comprises a downstream end surrounding a downstream end of the electrical machine and located in said stretch, and wherein at least portions of said stationary vanes are connected to the external annular surface between said upstream and downstream ends of the external annular surface.

2. The turbine engine of claim 1, wherein the elements are recessed or protruding on one or more surfaces of the shroud and/or the stationary vanes, said surface or each of said surfaces being intended to be swept by the primary stream.

3. The turbine engine of claim 2, wherein said surface or each of said surfaces comprises a matrix of identical recessed elements distributed in rows and in columns.

4. The turbine engine of claim 3, wherein each of the elements has a concave curved shape in cross-section.

5. The turbine engine of claim 3, wherein each of the elements has a width or dimension D between 2 and 30 mm, and a depth P less than or equal to D.

6. The turbine engine of claim 2, wherein said surface or each of said surfaces comprises a series of elements shaped like an elongated groove extending substantially in a flow direction of the primary stream.

7. The turbine engine of claim 6, wherein the grooves are corrugated.

8. The turbine engine of claim 2, wherein said surface or each of said surfaces comprises a series of protruding elements formed by fins.

9. The turbine engine of claim 8, wherein the fins are triangular or delta shaped.

10. The turbine engine according to claim 1, wherein the elements comprise plasma generating actuators, said plasma generating actuators being suitable to generate plasma on said surface or each of said surfaces.

11. The turbine engine of claim 10, wherein the actuators are supplied with electricity by said electrical machine.

12. The turbine engine of claim 10, wherein the actuators are evenly distributed around the electrical machine.

13. The turbine engine according to claim 1, wherein the shroud comprises an internal annular surface that surrounds the stator of the electrical machine and an external annular surface that extends around the internal annular surface and defines said stretch of the flow duct of the primary stream.

14. The turbine engine according to claim 1, wherein said elements are connected by one or more thermally conductive parts to said stator so as to ensure a heat exchange by conduction.

15. An aircraft turbine engine, comprising a gas generator and a fan arranged upstream of the gas generator and configured to generate a gas inlet stream, a portion of which flows in a duct of the gas generator to form a primary stream and another portion of which flows in a duct around the gas generator to form a secondary stream, said fan having a fan shaft which is connected to a first rotor of the gas generator by means of a mechanical reducer, the turbine engine further comprising an electrical machine which has an annular shape and which is mounted coaxially downstream of the fan and upstream of the mechanical reducer, said electrical machine comprising a second rotor surrounding the fan shaft and surrounded by a stator, wherein said stator is carried by an annular shroud which surrounds said stator without spacing therebetween, said annular shroud extending axially downstream from the fan, wherein said shroud is surrounded by a casing of the gas generator which, together with said shroud, delimits an entrance and a stretch of said flow duct for the primary stream, wherein vanes for straightening said primary stream extend in said stretch, wherein said shroud and/or said stationary vanes comprise elements configured to generate disturbances in the primary stream, wherein said second rotor is directly connected to said fan by an annular connecting element including an upstream end connected to the fan and a downstream end connected to said second rotor, said annular connecting element being independent of said fan shaft and surrounding said fan shaft.

16. An aircraft turbine engine, comprising a gas generator and a fan arranged upstream of the gas generator and configured to generate a gas inlet stream, a portion of which flows in a duct of the gas generator to form a primary stream and another portion of which flows in a duct around the gas generator to form a secondary stream, said fan having a fan shaft which is connected to a first rotor of the gas generator by means of a mechanical reducer, the turbine engine further comprising an electrical machine which has an annular shape and which is mounted coaxially downstream of the fan and upstream of the mechanical reducer, said electrical machine comprising a second rotor surrounding the fan shaft and surrounded by a stator, wherein said stator is carried by an annular shroud which surrounds said stator without spacing therebetween, said annular shroud extending axially downstream from the fan, wherein said shroud is surrounded by a casing of the gas generator which, together with said shroud, delimits an entrance and a stretch of said flow duct for the primary stream, wherein vanes for straightening said primary stream extend in said stretch, wherein said shroud and/or said stationary vanes comprise elements configured to generate disturbances in the primary stream, wherein the second rotor surrounds a first stationary bearing support which surrounds the fan shaft, wherein first bearings are interposed between the second rotor and the first stationary bearing support so as to guide the second rotor about the first stationary bearing support, and wherein second bearings are interposed between the fan shaft and the a second stationary bearing support so as to guide the fan shaft within the second stationary bearing support, at least one of said second bearings being surrounded by said second rotor.

* * * * *